United States Patent [19]

Sakamoto

[11] Patent Number: 6,006,101
[45] Date of Patent: Dec. 21, 1999

[54] MOBILE RADIO COMMUNICATION SYSTEM, A MOBILE RADIO COMMUNICATION NETWORK AND A MOBILE RADIO STATION IN SAID MOBILE RADIO COMMUNICATION SYSTEM

[75] Inventor: Masayuki Sakamoto, Kanagawa-ken, Japan

[73] Assignee: Kabushiki Kaisha Toshiba, Kawasaki, Japan

[21] Appl. No.: 08/710,107

[22] Filed: Sep. 12, 1996

[30] Foreign Application Priority Data

Sep. 14, 1995 [JP] Japan .................................... 7-236615

[51] Int. Cl.⁶ ..................................................... H04Q 7/20
[52] U.S. Cl. ........................... 455/517; 455/574; 455/553; 455/343; 370/311
[58] Field of Search ..................................... 455/574, 383, 455/343, 517, 552, 553; 370/311, 38.2

[56] References Cited

U.S. PATENT DOCUMENTS

| | | | |
|---|---|---|---|
| 4,755,816 | 7/1988 | DeLuca | 340/825.44 |
| 5,152,006 | 9/1992 | Klaus | 455/89 |
| 5,463,477 | 10/1995 | Kakizaki | 358/431 |
| 5,475,374 | 12/1995 | Moore | 340/825.22 |
| 5,506,837 | 4/1996 | Sollner et al. | 370/31 |
| 5,537,415 | 7/1996 | Miller et al. | 370/95.1 |
| 5,629,940 | 5/1997 | Gaskill | 370/311 |
| 5,678,227 | 10/1997 | Connell et al. | 455/343 |
| 5,710,975 | 1/1998 | Bernhardt et al. | 455/38.3 |
| 5,714,944 | 2/1998 | Shimizu | 340/825.44 |
| 5,722,065 | 2/1998 | Ito et al. | 455/38.3 |
| 5,742,909 | 4/1998 | Uchida et al. | 455/517 |

FOREIGN PATENT DOCUMENTS

| | | |
|---|---|---|
| 4-302230 | 10/1992 | Japan . |
| 6-133364 | 5/1994 | Japan . |
| 6-141365 | 5/1994 | Japan . |

*Primary Examiner*—Reinhard J. Eisenzopf
*Assistant Examiner*—Darnell R. Armstrong
*Attorney, Agent, or Firm*—Finnegan, Henderson, Farabow, Garrett & Dunner, L.L.P.

[57] ABSTRACT

A mobile radio station PS1 in a mobile radio communication system shown in FIG. 1 receives a signal at a first interrupt time interval T1 or a second interrupt time interval T2.

The mobile station PS1 sets an interrupt time interval and informs the interrupt time interval to a control station CS. The mobile station PS1 receives a signal at the set interrupt time interval.

Receiving an incoming call from a calling station addressed to the mobile radio station PS1 which receives a signal at the second interrupt time interval T2, in case that the control station CS determines the calling station requires a simplex communication, the control station CS stores data addressed to the mobile radio station PS1 in the storing server SV, in case that the control station CS determines the calling station requires a bi-directional communication, the control station CS transmits a signal to the mobile radio station PS1. The signal requires to change the second interrupt time interval T2 to the first interrupt time interval T1.

42 Claims, 12 Drawing Sheets

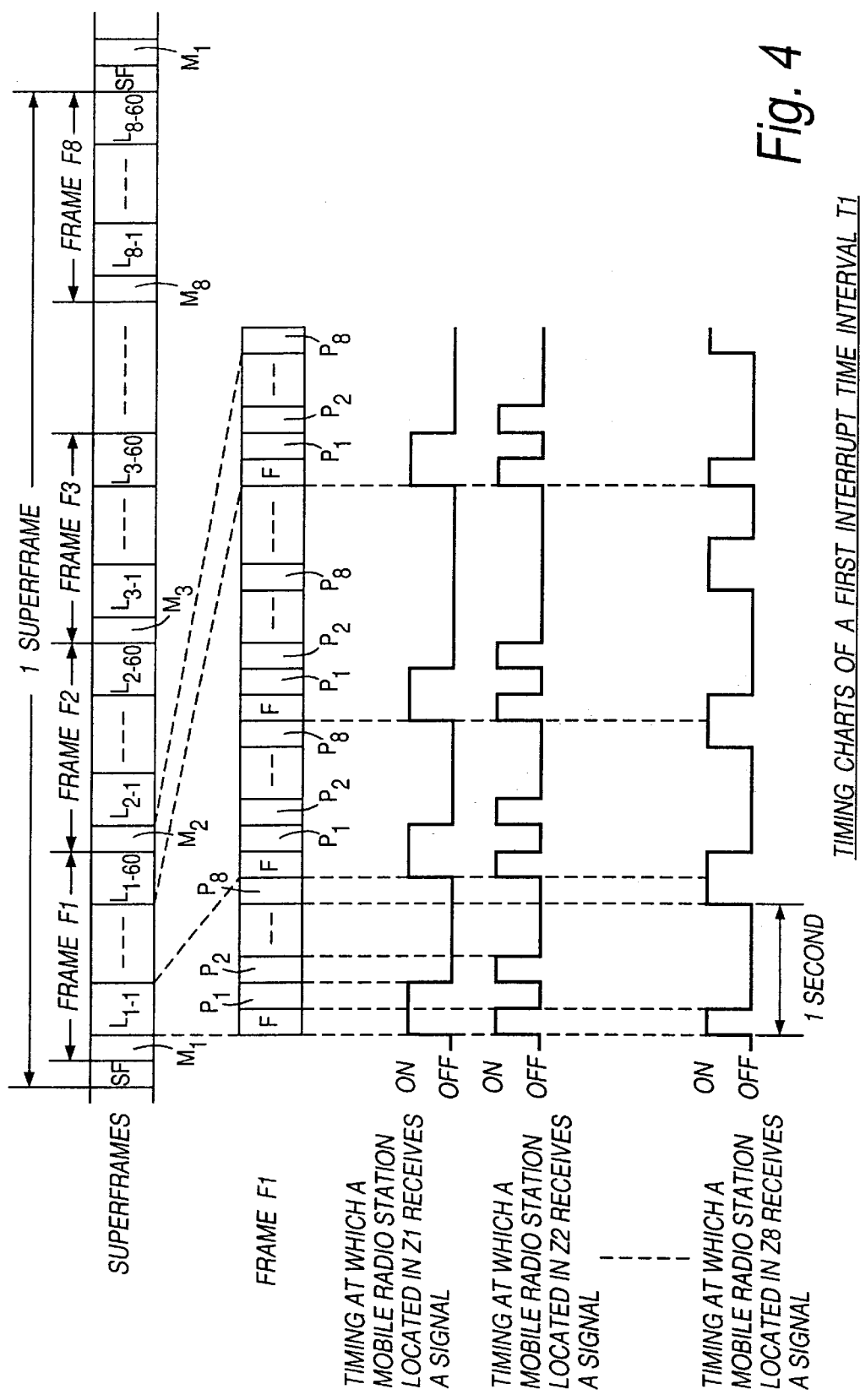

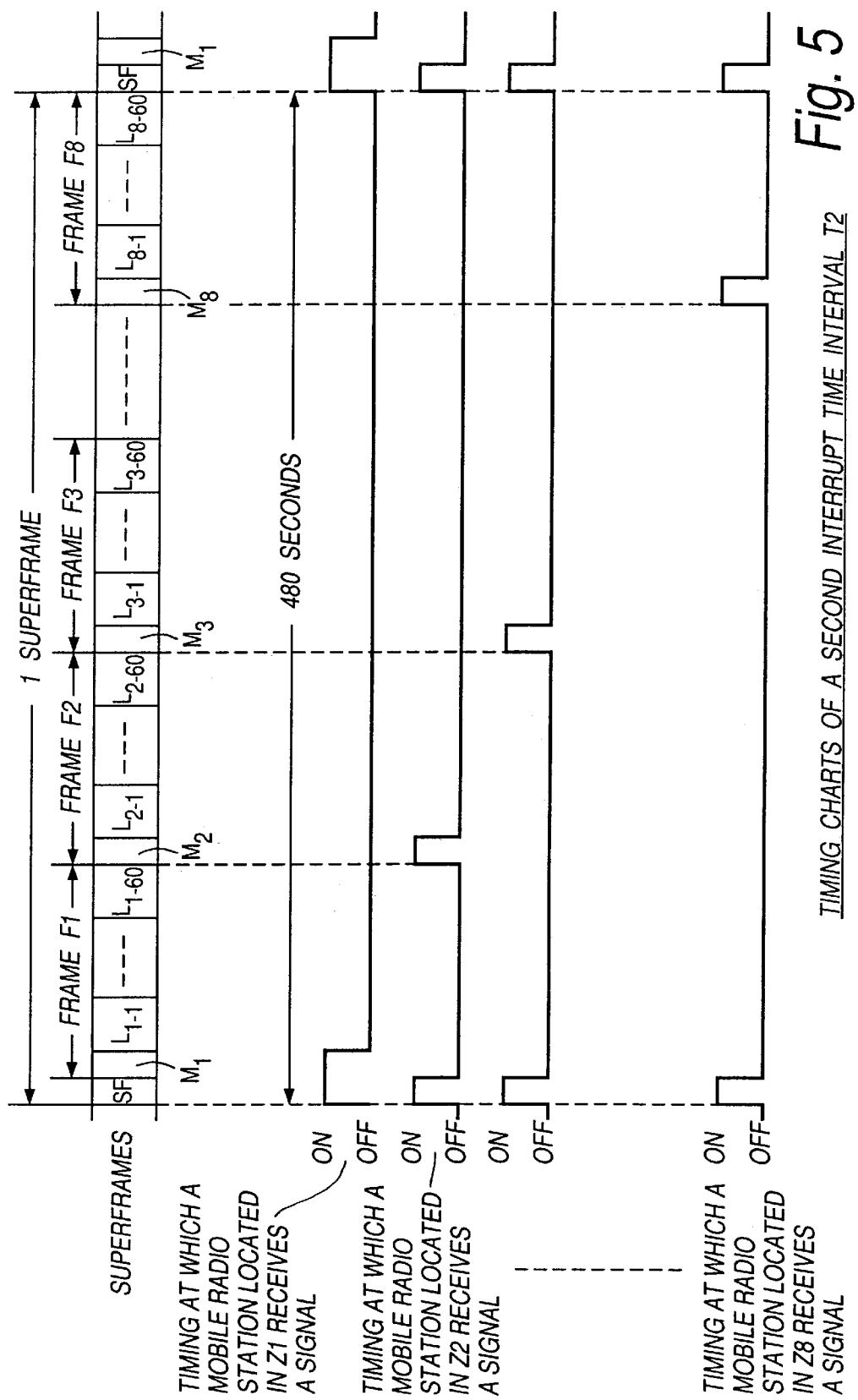

MOBILE RADIO COMMUNICATION SYSTEM, A MOBILE RADIO COMMUNICATION NETWORK AND A MOBILE RADIO STATION IN SAID MOBILE RADIO COMMUNICATION SYSTEM

BACKGROUND OF THE INVENTION

1. Field of the Invention

The present invention relates to the field of a mobile radio communication system, such as a portable radio telephone system or a vehicle telephone system. The present invention also relates to a mobile radio communication network in said mobile radio communication system and a mobile radio station in said mobile radio communication system.

2. Description of the Related Art

Generally, a mobile radio communication system has an intermittent power-supply system. The intermittent supply system is used for extending a using time of a mobile radio station. The mobile radio station has a battery as a power supply unit. Each of mobile radio stations in said system receives a signal intermittently at an interrupt time interval. An alternate expression for interrupt time interval is interrupt time cycle. In said system, each of mobile radio stations receives radio frequency signals only in the period of its control channel. Receiving the signals only in the period of its control channel reduces the consumption of the electric power.

For example, a cellular radio telecommunication system generally has two or more radio areas, each of said radio areas is controlled by a base station. The base station controls a plurality of mobile radio stations, said each mobile radio stations are located in each said radio areas. Said mobile radio stations are connected to the base stations over radio channels.

FIG. 10 shows a frame of one of said radio channels.

The frame consists of a frame synchronization channel F and eight paging channels P1 to P8. In other words, the system which uses the radio channel shown in FIG. 10 has 8 base stations BS1 to BS8. The system has 8 radio areas G1 to G8. Accordingly, the base station BSi controls mobile radio stations which are located in the radio area Gi (i=1 to 8).

Said system uses said frame synchronization channel F to transmit a frame synchronous signal, a outgoing call control channel number, and other information in said system. Said frame synchronous signal makes a mobile radio station set a frame synchronization.

In said system, the base station BSi (i=1 to 8) uses said paging channel Pi (i=1 to 8) to transmit an incoming call to the called mobile radio station which is located in the radio area the base station BSi (i=1 to 8) controls.

Accordingly, each of mobile radio stations which is controlled by a base station BSi receives radio frequency signals only in the period of the frame synchronization channel F and its paging channel Pi.

For example, as shown in FIG. 10, each of mobile radio stations which is located in the radio area G1 supplies a electric power to a part which requires a electric power and receives radio frequency signals only in the period of the frame synchronization channel F and the paging channel P1. In other period, the mobile radio station stops supplying a electric power to the part which requires a electric power in the mobile radio station, and stops receiving said signals.

As same as above, each of mobile radio stations which is located in radio area Gi supplies a electric power to a part which requires electric power only in the receiving period of the frame synchronization channel F and the paging channel Pi, in other period, said mobile radio station stops supplying the electric power.

As mentioned above, as each of mobile radio stations in said system receives a signal intermittently at an interrupt time interval. Receiving a signal intermittently at an interrupt time interval saves a 7/9 electric power, compared as always receiving radio frequency signals. In above system, increasing a number of the radio area reduces further electric power supplied to a mobile radio station. However, it also extends an interrupt time interval.

As a bad result for extending an interrupt time interval, it costs a long time for a mobile radio station to receive a signal transmitted from a mobile radio communication network in said system.

In the system, furthermore, the mobile radio station never selects an interrupt time interval. The mobile radio station has to receive a signal at a fixed interrupt time interval. Accordingly, the mobile radio station receives useless signal because of receiving the signal at the fixed interrupt time interval.

Furthermore, when the control station in said system receives an incoming call addressed to the mobile radio station, the incoming call indicating that a calling station requests a simplex communication (for example, voicemail, facsimile, other data communication), the mobile radio station has to always receive data in accordance with said simplex communication because that the mobile radio communication network doesn't store the data. An alternate expression for simplex communication is one-way communication.

SUMMARY OF THE INVENTION

It is an object of the present invention to provide a mobile radio communication system which reduces more electric power supplied to a mobile radio station in the mobile radio communication system. This invention also provides a mobile radio communication network or a mobile radio station in the mobile radio communication system.

This invention provides a mobile radio communication system including at least one mobile radio station and a mobile radio communication network connected to said mobile radio station over radio channels wherein said mobile radio station receives a signal intermittently at a first interrupt time interval or a second interrupt time interval which is shorter than said first interrupt time interval, said mobile radio communication system comprising:

said mobile radio station including:
    setting means for setting one of said first and second interrupt time intervals; and
    informing means for informing said set interrupt time interval of said mobile radio communication network.

This invention also provides a mobile radio station connected to a mobile radio communication network over radio channels wherein said mobile radio station called from a calling station through said mobile radio communication network receives a signal intermittently at a first interrupt time interval or a second interrupt time interval which is shorter than said first interrupt time interval, said mobile radio station receives data from said calling station through said mobile radio communication network, said mobile radio station comprising:

setting means for setting one of said first and second interrupt time intervals; and informing means for informing said set interrupt time interval of said mobile radio communication network.

It is another object of the present invention to provide a mobile radio communication system or a mobile radio communication network or a mobile radio station which prevents from transmitting useless signals to the mobile station. This invention also provides a mobile radio communication network or a mobile radio station in the mobile radio communication system.

this invention provides a mobile radio communication system including at least one mobile radio station and a mobile radio communication network connected to said mobile radio stations over radio channels wherein said mobile radio station called from a calling station through said mobile radio communication network receives a signal intermittently at a first interrupt time interval or a second interrupt time interval which is shorter than said first interrupt time interval, said mobile radio communication network receives data addressed to said mobile radio station, said mobile radio communication system comprising:

said mobile radio station including:
setting means for setting one of said first and second interrupt time intervals; and
informing means for informing said interrupt time interval of said mobile radio communication network;

said mobile radio communication network including:
determining means for determining whether said calling station requires a simplex communication or a bi-directional communication,
wherein said mobile radio communication network transmits said received data to said mobile station in case that said determining means determines that said calling station requires said simplex communication and said informed interrupt time interval is said second interrupt time interval.

This invention also provides a mobile radio communication network connected to at least mobile radio station over radio channels wherein said mobile radio station called from a calling station receives a signal intermittently at a first interrupt time interval or a second interrupt time interval which is shorter than said first interrupt time interval, said mobile radio station informs said first interrupt time interval or said second interrupt time interval of said mobile radio communication network, said mobile radio communication network comprising:

determining means for determining whether said calling station requires a simplex communication or a bi-directional communication,
wherein said mobile radio communication network transmits said received data to said mobile station in case that said determining means determines that said calling station requires a simplex communication and said informed interrupt time interval is said second interrupt time interval.

This invention also provides a mobile radio communication system including at least one mobile radio station and a mobile radio communication network connected to said mobile radio stations over radio channels wherein said mobile radio station receives a signal intermittently at a first interrupt time interval or a second interrupt time interval which is shorter than said first interrupt time interval, said mobile radio communication system comprising:

said mobile radio station including:
setting means for setting one of said first and second interrupt time intervals; and
informing means for informing said set interrupt time interval of said mobile radio communication network;

said mobile radio communication network including:
determining means for determining whether said calling station requires a simplex communication or a bi-directional communication to a mobile radio station; and
transmitting means for transmitting a signal to said mobile radio station, said signal indicating that said mobile radio communication network requires to change said first interrupt time interval to said second interrupt time interval in case that said determining means determines said calling station requires a simplex communication and said informed interrupt time interval is said first interrupt time interval.

This invention also provides a mobile radio communication system including at least one mobile radio station and a mobile radio communication network connected to said mobile radio stations over radio channels wherein said mobile radio station called from a calling station through said mobile radio communication network receives a signal intermittently at a first interrupt time interval or a second interrupt time interval which is shorter than said first interrupt time interval, said mobile radio communication system comprising:

said mobile radio station including:
setting means for setting one of said first and second interrupt time intervals; and
informing means for informing said set interrupt time interval of said mobile radio communication network;

said mobile radio communication network including:
determining means for determining whether said calling station requires a simplex communication or a bi-directional communication to said mobile radio station; and
transmitting means for transmitting a signal to said mobile radio station, said signal indicating that said mobile radio communication network requires to change said first interrupt time interval to said second interrupt time interval in case that said determining means determines that said calling station requires a bi-directional communication and said informed interrupt time interval is said first interrupt time interval.

This invention also provides a mobile radio communication system including at least one mobile radio station and a mobile radio communication network connected to said mobile radio station over radio channels wherein said mobile radio station called from a calling station through said mobile radio communication network receives a signal intermittently at a first interrupt time interval or a second interrupt time interval which is shorter than said first interrupt time interval, said mobile radio communication system comprising:

said mobile radio station including:
setting means for setting one of said first and second interrupt time intervals; and
informing means for informing said set interrupt time interval of said mobile radio communication network;

said mobile radio communication network including:
determining means for determining whether said calling station requires a simplex communication or a bi-directional communication to said mobile radio station; and
prevent means for preventing said calling station from being connected to said mobile radio station in case that said determining means determines said calling station requires a bi-directional communication and said informed interrupt time interval is said first interrupt time interval.

This invention also provides a mobile radio communication network connected to at least mobile radio station over radio channels wherein said mobile radio station called from a calling station receives a signal intermittently at a first interrupt time interval or a second interrupt time interval which is shorter than said first interrupt time interval, said mobile radio station informs said first interrupt time interval or said second interrupt time interval of said mobile radio communication network, said mobile radio communication network comprising:

determining means for determining whether said calling station requires a simplex communication or a bi-directional communication to said mobile radio station; and:

transmitting means for transmitting a signal which requires to change said first interrupt time interval to said second interrupt time interval to said mobile radio station in case that said determining means determines said calling station requires a simplex communication and said informed interrupt time interval is said first interrupt time interval.

This invention also provides a mobile radio communication network connected to at least mobile radio station over radio channels wherein said mobile radio station called from a calling station receives a signal intermittently at a first interrupt time interval or a second interrupt time interval which is shorter than said first interrupt time interval, said mobile radio station informs said first interrupt time interval or said second interrupt time interval of said mobile radio communication network, said mobile radio communication network comprising:

determining means for determining whether said calling station requires a simplex communication or a bi-directional communication to said mobile radio station; and transmitting means for transmitting a signal which requires to change said second interrupt time interval to said first interrupt time interval to said mobile radio station in case that said determining means determines said calling station requires a bi-directional communication and said informed interrupt time interval is said second interrupt time interval.

This invention also provides a mobile radio communication network connected to at least mobile radio station over radio channels wherein said mobile radio station called from a calling station receives a signal intermittently at a first interrupt time interval or a second interrupt time interval which is shorter than said first interrupt time interval, said mobile radio station informs said first interrupt time interval or said second interrupt time interval of said mobile radio communication network, said mobile radio communication network comprising:

determining means for determining whether said calling station requires a simplex communication or a bi-directional communication to said mobile radio station; and prevent means for preventing said calling station from being connected to said mobile radio station in case that said determining means determines said calling station requires a bi-directional communication and said informed interrupt time interval is said second interrupt time interval.

It is another object of the present invention to provide a mobile radio communication system which surely transmits data in accordance with simplex communication to a mobile radio station in the system. This invention also provides a mobile radio communication network or a mobile radio station in the mobile radio communication system.

This invention provides a mobile radio communication system including at least one mobile radio station and a mobile radio communication network connected to said mobile radio stations over radio channels and at least one base station controlled by said mobile radio communication network wherein said mobile radio station called from a calling station through said mobile radio communication network receives a signal intermittently at a first interrupt time interval or a second interrupt time interval which is shorter than said first interrupt time interval, said mobile radio communication network receives data addressed to one of said mobile radio stations, said base station covers a radio control area, said mobile radio communication system comprising:

said mobile radio station including:

setting means for setting one of said first and second interrupt time intervals; and informing means for informing said set interrupt time interval of said mobile radio communication network;

said mobile radio communication network including:

storing means for storing said received data; and determining means for determining whether said calling station requires a simplex communication or a bi-directional communication to a mobile radio station, wherein said storing means stores said received data in case that said determining means determines that said calling station requires said simplex communication and said informed interrupt time interval is said first interrupt time interval.

This invention also provides a mobile radio communication network connected to at least mobile radio station over radio channels wherein said mobile radio station called from a calling station receives a signal intermittently at a first interrupt time interval or a second interrupt time interval which is shorter than said first interrupt time interval, said mobile radio station informs said first interrupt time interval or said second interrupt time interval of said mobile radio communication network, said mobile radio station receives data from said calling station, said mobile radio communication network comprising:

storing means for storing received data: and determining means for determining whether said calling station requires a simplex communication or a bi-directional communication to said mobile radio station, wherein said storing means stores said transmitted data in case that said determining means determines said calling station requires a simplex communication and said informed interrupt time interval is said first interrupt time interval.

This invention also provides a mobile radio station connected to a mobile radio communication network over radio channels wherein said mobile radio station called from a calling station receives a signal intermittently at a first interrupt time interval or a second interrupt time interval which is shorter than said first interrupt time interval, said mobile radio communication network receives data from said calling station, said mobile radio communication network has a storing means for storing said received data, said mobile radio communication network transmits said signal to said mobile station through a base station covering a radio control area, said mobile radio station comprising:

inquiring means for inquiring of said mobile radio communication network whether said storing means stores received data addressed to said mobile station or not.

BRIEF DESCRIPTION OF THE DRAWINGS

The accompanying drawings, which are incorporated in and constitute a part of-the-specification, illustrate presently preferred embodiments of the invention, and together-with-the-general description given above and the detailed description of the preferred embodiments given below, serve to explain the principles of the invention.

FIG. 4 are timing charts showing a receiving timing which a mobile radio station receives a signal at the first interrupt time interval T1.

FIG. 5 are timing charts showing a receiving timing which a mobile radio station receives a signal at the second interrupt time interval T2.

DETAILED DESCRIPTION OF THE PREFERRED EMBODIMENTS

Figure 1:
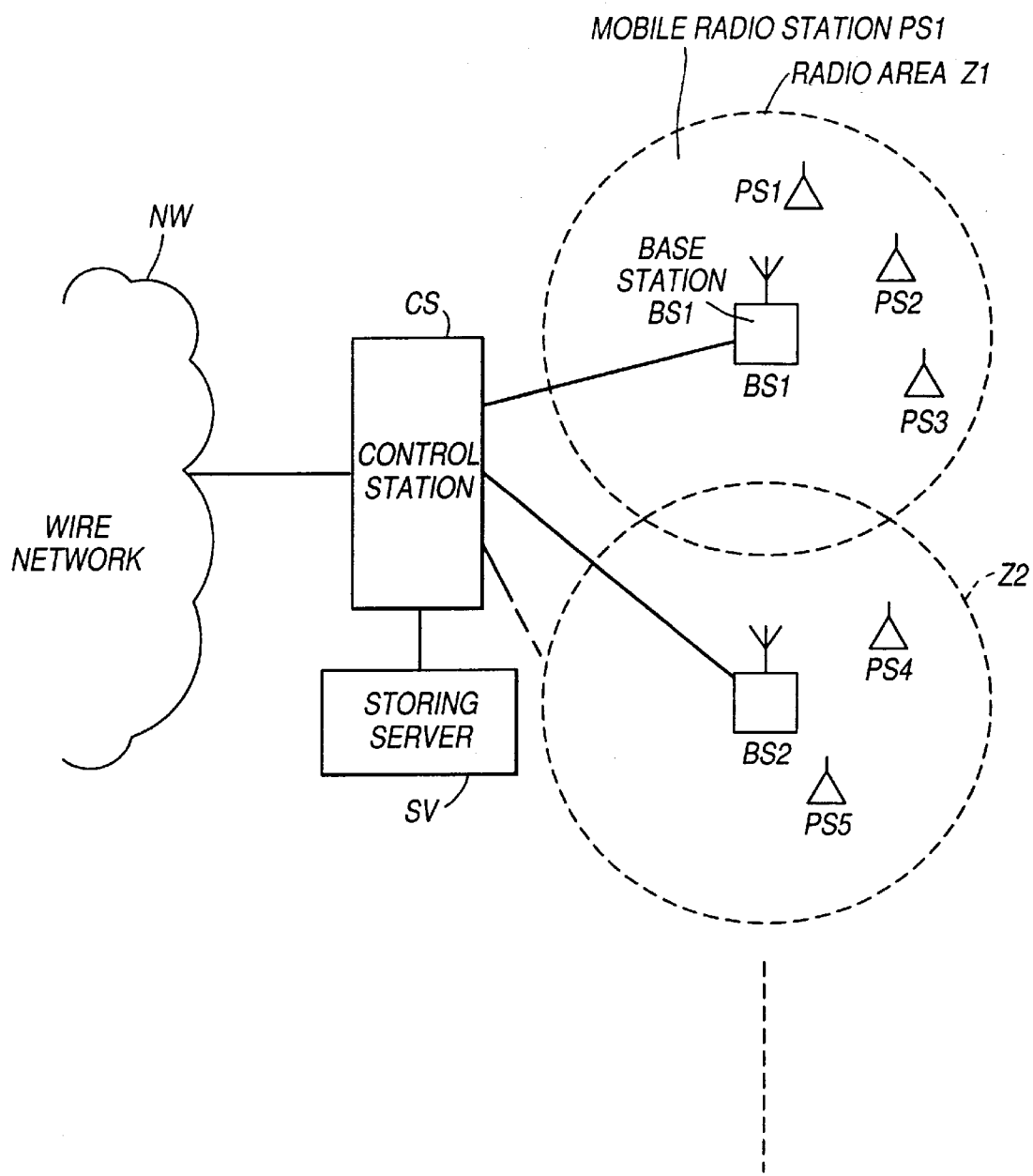
FIG. 1 is a schematic view showing a cellular portable radio telephone system which is corresponded to an embodiment of the present invention.

FIG. 1 is a schematic view showing an arrangement of a cellular portable radio telephone system. The cellular portable radio telephone system is a kind of mobile radio communication systems.

This system comprises a control station CS connected to a wire network NW, a storing server SV connected to a control station CS, a plurality of base stations BS1 to BSn connected to the control station CS over wire lines CL1 to CLn, respectively, and a plurality of mobile radio stations PS1 to PSn connected to predetermined base stations by radio. The base stations BS1 to BSn respectively form radio areas Z1 to Zn in different areas. The mobile radio stations PS1 to PSn are connected over radio channels to the base stations in the radio areas which they are located, and further connected to the wire network NW over the base stations and control station CS. The storing server SV stores data addressed to the mobile radio stations PS1 to PSn. Said data are, for example, voice data, mail data, or facsimile data.

In the system, the base stations BS1 to BSn and the mobile radio stations PSn to PSn share a plurality of radio frequencies. That is, when an outgoing call is generated or an incoming call is received, a free radio frequency is selected from these radio frequencies to connect one of the base stations BS1 to BSn to a corresponding mobile radio stations over a radio channel.

Figure 2:
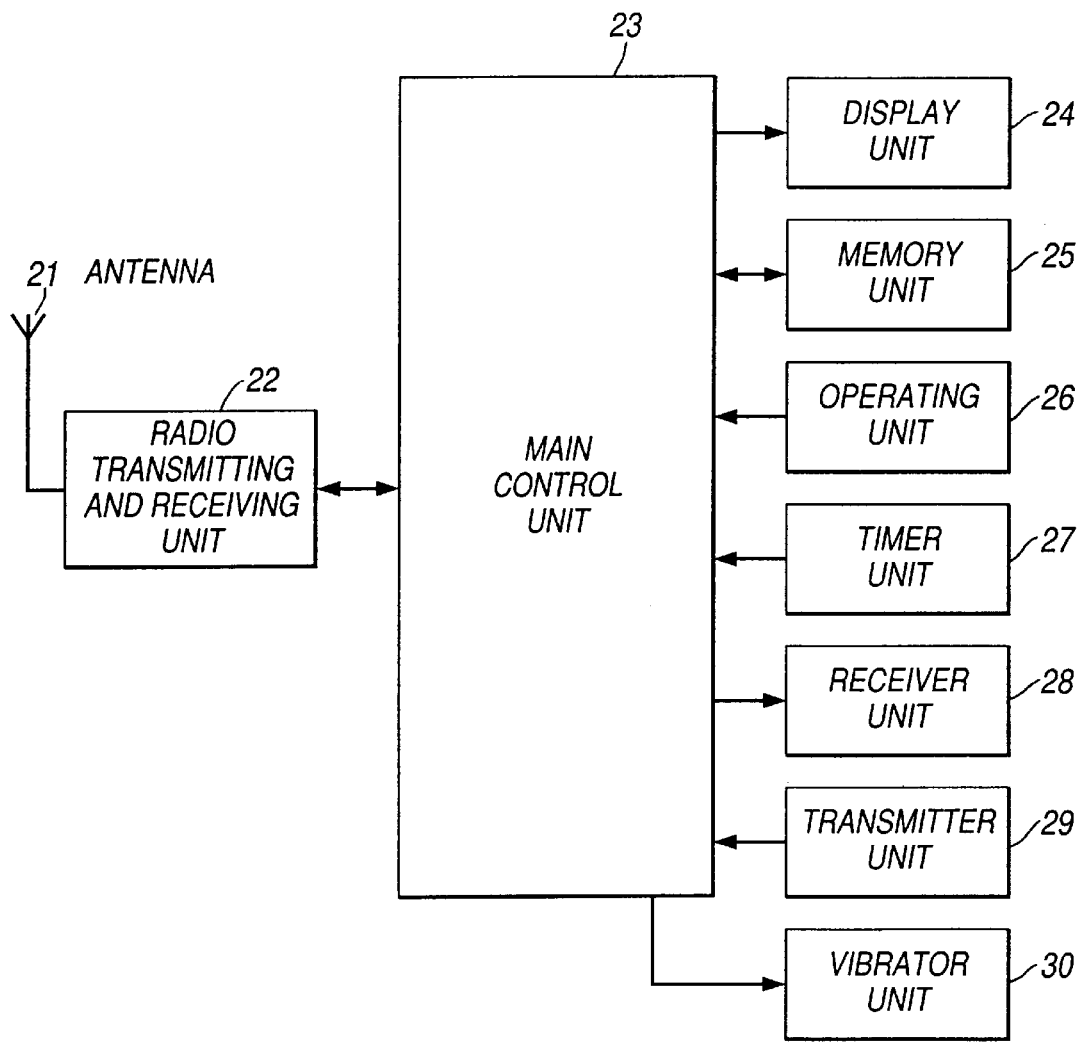
FIG. 2 is a schematic view showing a radio mobile communication apparatus PSi which is corresponded to an embodiment of the present invention.

FIG. 2 is a block diagram showing an arrangement associated with the mobile radio station PSn.

The mobile radio station PSn, as shown in FIG. 2, has an antenna 21, a radio transmitting and receiving unit 22, a main control unit 23, a display unit 24, a memory unit 25, an operation unit 26, a timer unit 27, a transmitter 28, and a receiver 29, a vibrator 30.

The antenna 21 connected to the radio transmitting and receiving unit 22, transmits a signal to the base station BS1, over radio channels and a signal from the base station BS1 over radio channel.

The radio transmitting and receiving unit 22 demodulates electric signals received from the antenna 21 into the digital data and modulates digital data received from the main control unit 23 into electric signals.

The main control unit 23 has a microprocessor as a main control circuit. The main control unit 23 sets an interrupt time interval. The interrupt time interval is set in accordance with data inputted from the operating unit 26 or a time which the timer unit 27 clocks or data transmitted from the control station CS. The mobile radio station PSn receives a signal intermittently at the set interrupt time interval. The main control unit 23 informs the set interrupt time interval to the control station CS through the base station.

The display unit 24, connected to the main control unit 23, consists of, for example, liquid crystal display (LCD), and displays data which are inputted from operation unit 26 or stored in memory unit 27 or received from the base stations.

The memory unit 25, connected to the main control unit 23, consists of, for example, a plurality of semiconductor memories, and it stores data which the main control unit 23 processes.

The operation unit 26, connected to the main control unit 23, is an inputting mean for inputting data which control the mobile radio station.

The timer unit 27, connected to the main control unit 23, is a timing mean.

The receiver 28, connected to the main control unit 23, is a outputting mean for outputting operator's voices or receiving signals as a sound.

The transmitter 29, connected to the main control unit 23, is an inputting mean for inputting operator's voices.

The vibrator 30, connected to the main control unit 23, is an alarming mean for informing with vibration that the mobile radio station received data.

The mobile radio station PSn has two type of interrupt time intervals, a first interrupt time interval T1, a second interrupt time interval T2.

The first interrupt time interval T1 has no effect on connection delay. For example, T1 is one second. The second interrupt time interval T2 is suitable for low traffic time area, for example midnight time area. For example, T2 is 480 seconds. The second interrupt time interval T2 is longer than the first interrupt time interval T1.

If the first interrupt time interval T1 is set in the mobile radio station PSn, the mobile radio station PSn receives a signal intermittently at the first interrupt time interval T1 over a control channel from a base station.

If the second interrupt time interval T2 is set in the mobile radio station PSn, the mobile radio station PSn receives signals intermittently at the first interrupt time interval T2 over a control channel from a base station.

Each of mobile radio stations PS2 to PSn has a same block diagram as the mobile radio station PS1.

Figure 3:
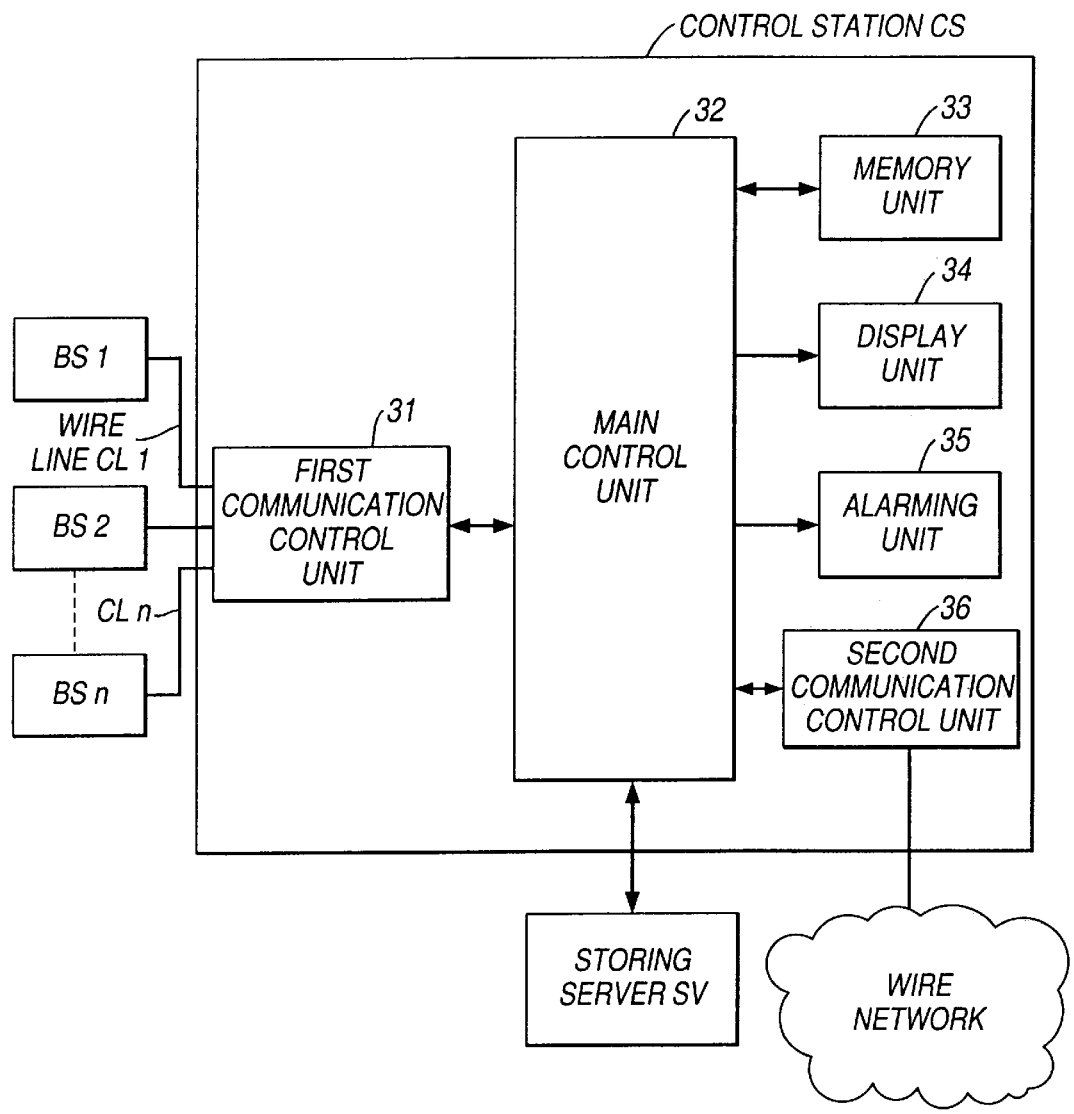
FIG. 3 is a schematic view showing control station CS which is corresponded to an embodiment of the present invention.

FIG. 3 is a block diagram showing an arrangement associated with a mobile radio communication network.

The mobile communication network has a control station CS, bases stations BS1 to BSn, and a storing server SV.

The control station CS, as shown in FIG. 3, has a first communication control unit 31, a main control unit 32, a memory unit 33, a display unit 34, an alarming unit 35 and a second communication unit 36.

The first communication control unit 31 connected to the base stations BS1 to BSn over the wire lines CL1 to CLn receives signals from the base stations BS1 to BSn over the wire lines CL1 to CLn. The communication control unit 31 transmits the received signals to the main control unit 32.

The memory unit 33, connected to the main control unit 32, consists of, for example, a plurality of semiconductor memories, and stores data which the main control unit 32 processes.

The display unit 34, connected to the main control unit 32, consists of, for example, liquid crystal display (LCD), The display unit 34 displays various kinds of data to inform the data to the operator of the control station CS.

The alarming unit 35 consists of, for example, buzzers, lamps and informs an alarm to an operator by sound or light.

The second communication unit 36 connected to another network, communicates the network.

The main control unit 32 has a microprocessor as a main control circuit. The main control unit 32 determines whether the calling station requires bi-directional communication (for example, communications of telephone or television telephone) or simplex communication (for example, voicemail, facsimile, other data communication) in accordance with an information of a communication service received from the calling station. For example, the bi-directional communication means communications of telephone or television telephone, simplex communication means voicemail, facsimile, other data communication.

The main control unit 32 recognizes an interrupt time interval at which each of mobile radio stations PS1 to PSn receives.

The main control unit 32 recognizes a communication service and sets an interrupt time interval.

FIG. 4 are timing charts showing a transmitting timing which the control station CS transmits a signal at a first interrupt time interval and a receiving timing which a mobile radio station receives a signal at the first interrupt time interval T1.

FIG. 5 are timing charts showing a transmitting timing which the control station CS transmits a signal at a second interrupt time interval T2 and a receiving timing which a mobile radio station receives a signal at the second interrupt time interval T2.

The control station CS transmits a signal to each of the mobile radio stations PS1 to PSn over a control channel which consists of superframes. The control station CS receives a signal from each of the mobile radio stations PS1 to PSn over a radio control channel which consists of superframes.

As shown in FIG. 4, a superframe consists of a synchronous channel SF and eight time division multiple frames F1 to F8.

The control station CS transmits a synchronization signal to each of mobile radio stations which receives a signal intermittently at the second interrupt time interval over the synchronous channel SF to synchronize themselves.

The time division multiple frame Fn consists of a subframe Mn, sixty subframes Ln-1 to Ln-60 (n=1 to 8).

The subframes M1 to M8 is used for transmitting signals to each of mobile radio stations which receives signals intermittently at the second interrupt time interval to synchronize themselves.

As shown in FIG. 4, each subframes Ln-1 to Ln-60 consists of a synchronous channel F and paging channels P1 to P8 (n=1 to 8).

The synchronous channel F is used for transmitting a synchronization signal to synchronize, a outgoing call control channel number and the other system information to each of mobile radio stations PS1 to PSn which receives a signal intermittently at the first interrupt time interval.

A mobile radio station controlled by the base station BSn, which receives a signal intermittently at the first interrupt time interval, uses the paging channel Pn for receiving an incoming call control signal (n=1 to 8). The mobile radio station supplies an electric power and receives a signal only in the synchronous channel F and the paging channel Pn (n=1 to 8).

For example, as shown in FIG. 4, the mobile radio station located in a radio area Z1, which receives a signal intermittently at the first interrupt time interval, uses the paging channel P1 for receiving an incoming call control signal. The radio area Z1 is covered by the base station BS1. The mobile radio station supplies an electric power and receives a signal only in the synchronous channel F and the paging channel P1. Similarly, the mobile radio station located in a radio area Z2, which receives a signal intermittently at the first interrupt time interval, uses the paging channel P2 for receiving an incoming call control signal. The mobile radio station supplies an electric power and receives a signal only in the synchronous channel F and the paging channel P2. Similarly, the mobile radio station located in a radio area Z8, which receives a signal intermittently at the first interrupt time interval, uses the paging channel P8 for receiving an incoming call control signal. The mobile radio station supplies an electric power and receives a signal only in the synchronous channel F and the paging channel P8. As shown in FIG. 4, the mobile radio station located in a radio area Zn, which receives a signal intermittently at the second interrupt time interval, uses the subframe Mn for receiving an incoming call control signal (n=1 to 8). The mobile radio station supplies an electric power and receives a signal only in the synchronous channel SF and the subframe Mn (n=1 to 8).

For example, as shown in FIG. 5, the mobile radio station locates in the radio area Z1, which receives a signal intermittently at the second interrupt time interval, uses the subframe M1 for receiving an incoming call control signal. The radio area Z1 is covered by the base station BS1. The mobile radio station supplies an electric power and receives a signal only in the synchronous channel SF and the subframe M1. Similarly, the mobile radio station located in the radio area Z2, which receives a signal intermittently at the second interrupt time interval, uses the subframe M2 for receiving an incoming call control signal. The mobile radio station supplies an electric power and receives a signal only in the synchronous channel SF and the subframe M2. Similarly, the mobile radio station located in the radio area Z3, which receives a signal intermittently at the second interrupt time interval, uses the subframe M3 for receiving an incoming call control signal. The mobile radio station supplies an electric power and receives a signal only in the synchronous channel SF and the subframe M3. Similarly, the mobile radio station located in the radio area Z8, which receives a signal intermittently at the second interrupt time interval, uses the subframe M8 for receiving an incoming call control signal. The mobile radio station supplies an electric power and receives a signal only in the synchronous channel SF and the subframe M8.

As shown in FIG. 3, a storing server SV is connected to the control station CS. When the main control unit 32 in the control station CS determines that a calling station requires a simplex communication (for example, voicemail, facsimile, other data communication), the storing server SV stores data received from the calling station in accordance with the simplex communication.

Receiving a call incoming origination which requires a simplex communication (for example, facsimile communication) addressed to a mobile radio station which receives a signal intermittently at the second interrupt time interval, the control station CS don't transmit the data received from the calling station in accordance with the simplex communication. And the storing server SV stores the data.

Each of mobile radio stations inquires the control station CS whether the storing server SV stores data which will be transmitted to the mobile radio station PSn. If the storing server SV stores the data which will be transmitted to the mobile radio station, the control station CS reads said data from the storing server SV, and transmits said data to the mobile radio station which inquired to the control station CS.

When the control station CS receives an incoming call which requires a bi-directional communication, (for example, communication of telephone or television telephone) addressed to a mobile radio station which receives a signal intermittently at the second interrupt time interval T2, the control station also transmits a signal which requires to change the first interrupt time interval T2 to the first interrupt time interval T1. After receiving the signal, the mobile radio station changes the second interrupt time interval T2 to the first interrupt time interval T1.

Additionally, the control station CS also informs a mobile radio station that the calling station requires a bi-directional communication and transmits a message which requires to call again after few minutes to the calling station.

FIGS. 6–9 are flow charts showing a control sequence in said cellular portable radio telephone system.

Each of mobile radio stations PS1 to PSn sets an interrupt time interval in accordance with the time which the timer unit 27 clocks. For example, the mobile radio station PSn receives a signal intermittently at the first interrupt time interval T1 (T1=1 second) in the noon or receives a signal intermittently at the second interrupt time interval T2 (T2= 480 seconds) in the night from A.M.1:00 to A.M.7:00. Additionally, an operator also sets an interrupt time interval by operating the operating unit 26.

The main control unit 23 informs the interrupt time interval to the control station CS. The main control unit 23 informs the interrupt time interval to the control station CS over a outgoing call control channel. The control station CS memories the interrupt time interval.

Figure 6A:
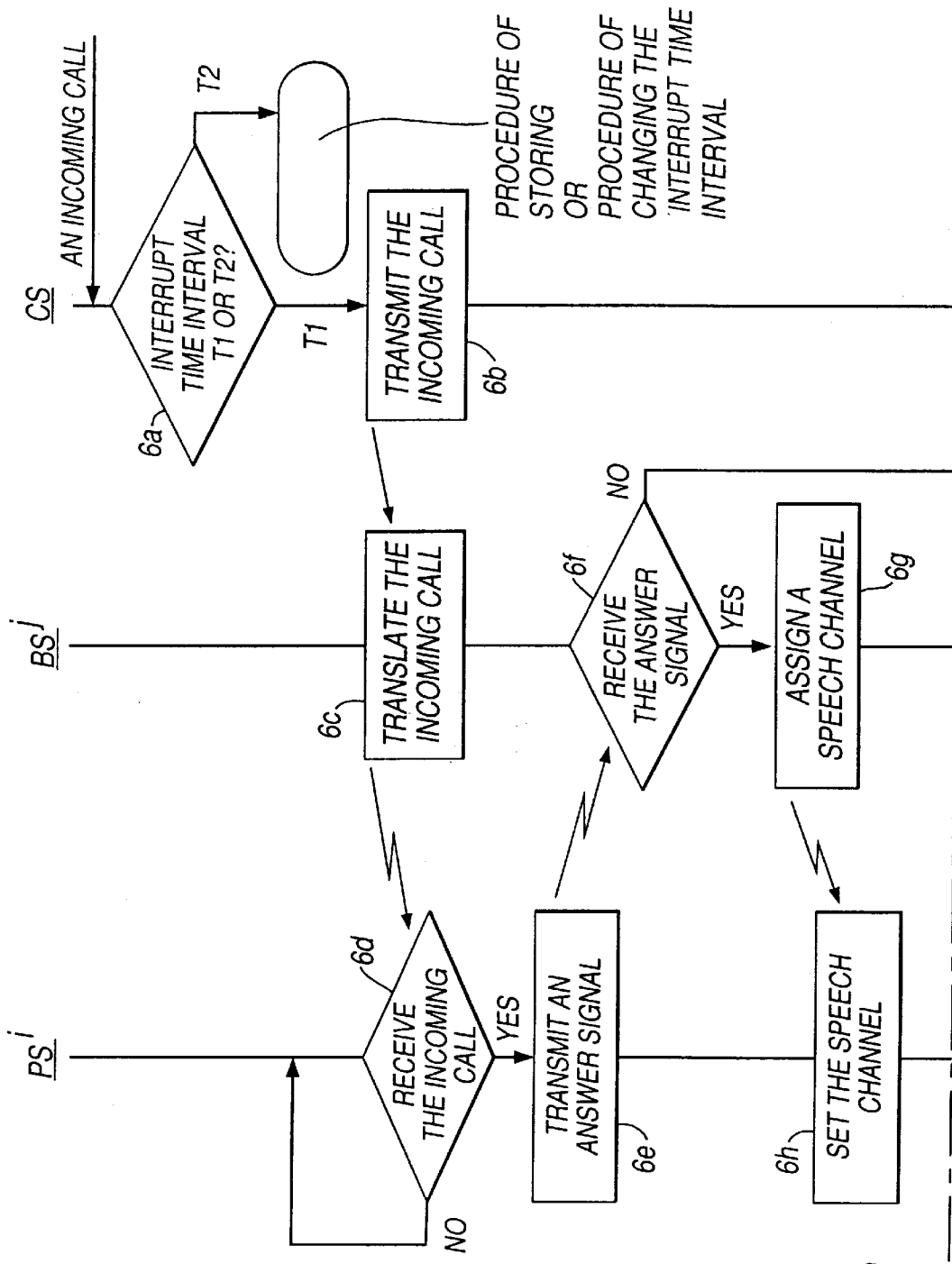
FIG. 6 are flow charts showing a procedure in said cellular portable radio telephone system as shown in FIG. 1 when a control station CS receives an incoming call which calls a mobile station PSi.
Figure 6B:
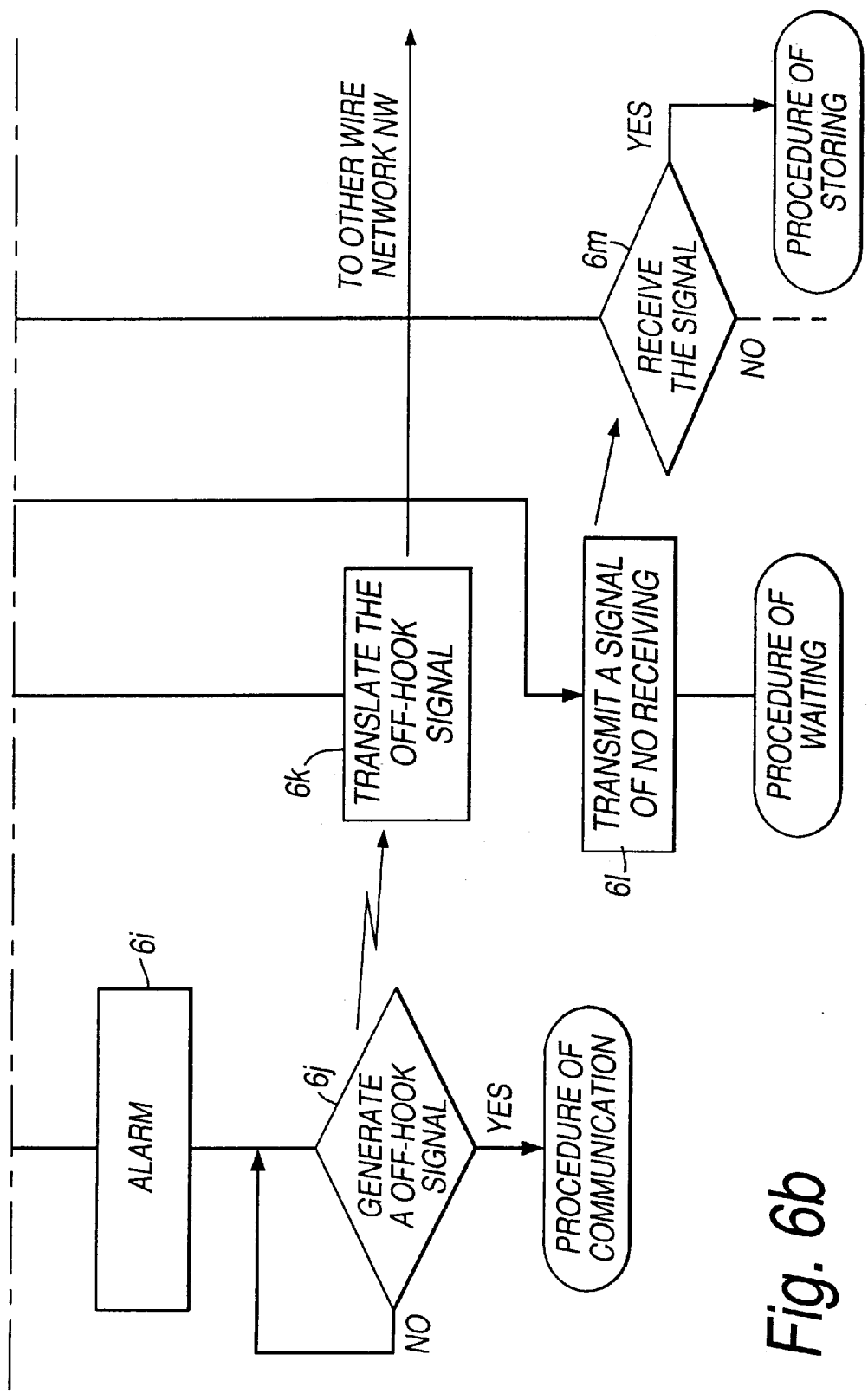

In the above system, for example, as showing FIG. 6, when the control station CS receives an incoming call addressed to a mobile radio station PSi from the other communication network NW, the main control unit 32 determines whether the mobile radio station PSi receives a signal at the first interrupt time interval T1 or the second interrupt time interval T2(step (6a)).

If the mobile radio station PSi receives a signal at the first interrupt time interval T1, the control station CS transmits the incoming call signal including an identification number of the mobile radio station PSi (step(6b)).

The control station CS transmits the incoming call signal to the mobile radio station PSi over the base station BSj (step(6c)). The base station BSj covers the area in which the mobile radio station PSi is located.

For example, as shown in FIG. 4, if the mobile radio station PSi is located in the area Z1, the control station CS transmits the incoming call signal through the base station BS1 over the paging channel P1 in the subframe L. Accordingly, the mobile radio station PSi located in the area, said the area covered by the base station BSj, receives a signal at the first interrupt time interval over the paging channel Pj.

When the mobile radio station PSi receives the incoming call signal addressed to the mobile radio station PSi (step (6d)), the mobile radio station BSj (step(6e)).

When the base station BSj receives the answering signal from the mobile radio station PSi (step(6f)), the base station BSj selects a free radio channel as a speech channel, and informs the free radio channel to the mobile radio station PSi over the incoming call control channel (step(6g)).

When the mobile radio station PSi receives the information of the free channel, the mobile radio station PSi sets free radio channel which the base station BSj informs as a speech channel (step(6h)). After setting the speech channel, the mobile station PSi alarms to the operator of the mobile radio station PSi (step(6i)).

The mobile radio station PSi monitors whether an off-hook signal is operated or not (step(6j)). When the off-hook signal is generated, the mobile radio station PSi transmits the off-hook signal to the calling station in the other network NW through the base station BSj (step(6k)). Accordingly, the calling station connected to the mobile radio station PSi.

If the mobile radio station PSi can't transmit the answering signal to the base station BSj because the mobile radio station PSi is in the condition that the power switch is off, or located out of a radio area which the control station CS can control(step(6f)), the base station BSj transmits a signal of no receiving the answering signal from the mobile radio station PSi to the control station CS(step(6l)). After receiving the signal, the control station CS translated to a following procedure of storing (step(6m)).

If the mobile radio station PSi which is called from the calling station receives a signal intermittently at the second interrupt time T2(step(6a)), the control station CS determines that the mobile radio station PSi has a danger of no connection with the control station CS because of the connection delay.

Figure 7:
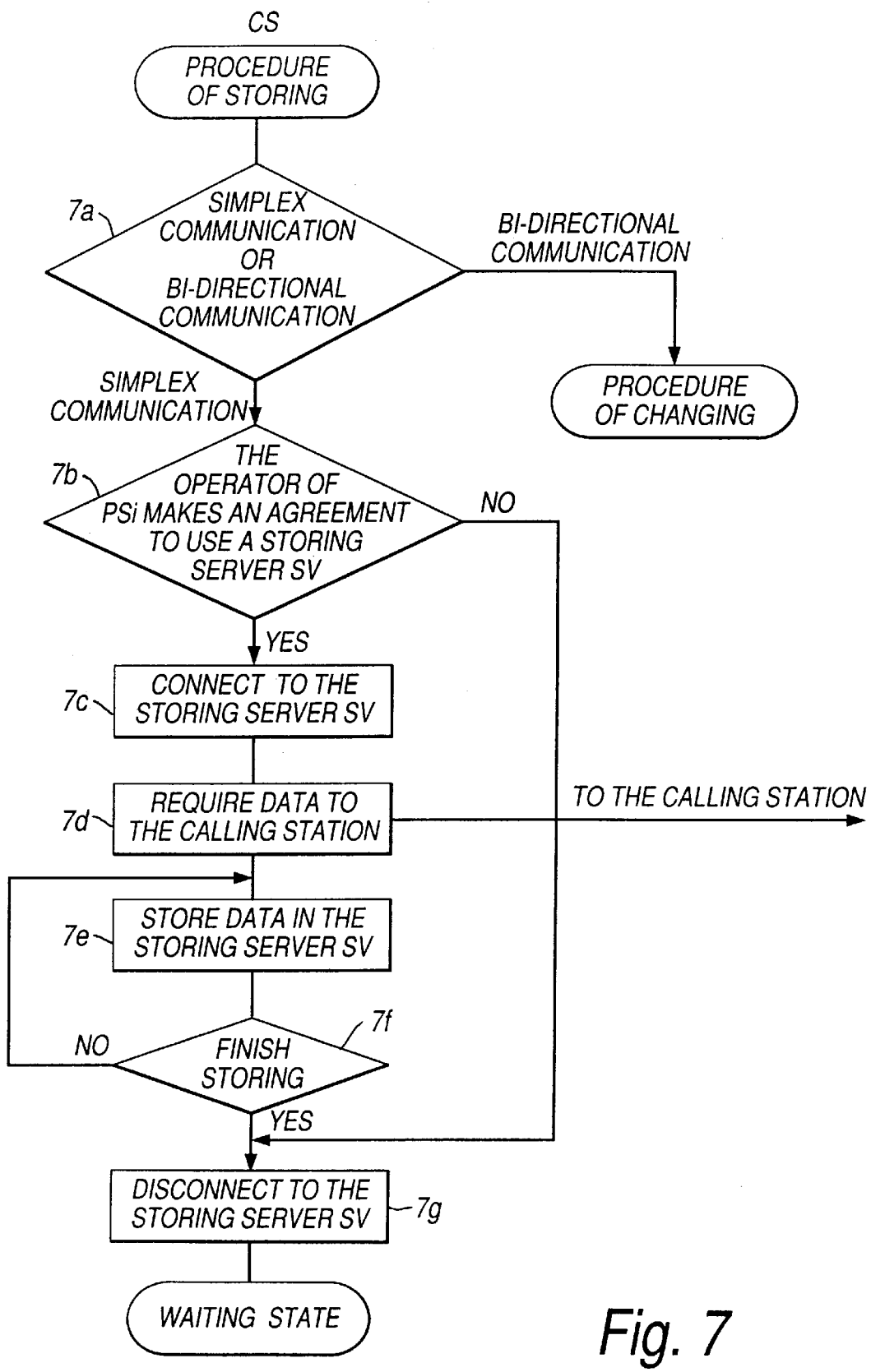
FIG. 7 is a flow chart showing a procedure of storing data transmitted from the calling station.
Figure 9:
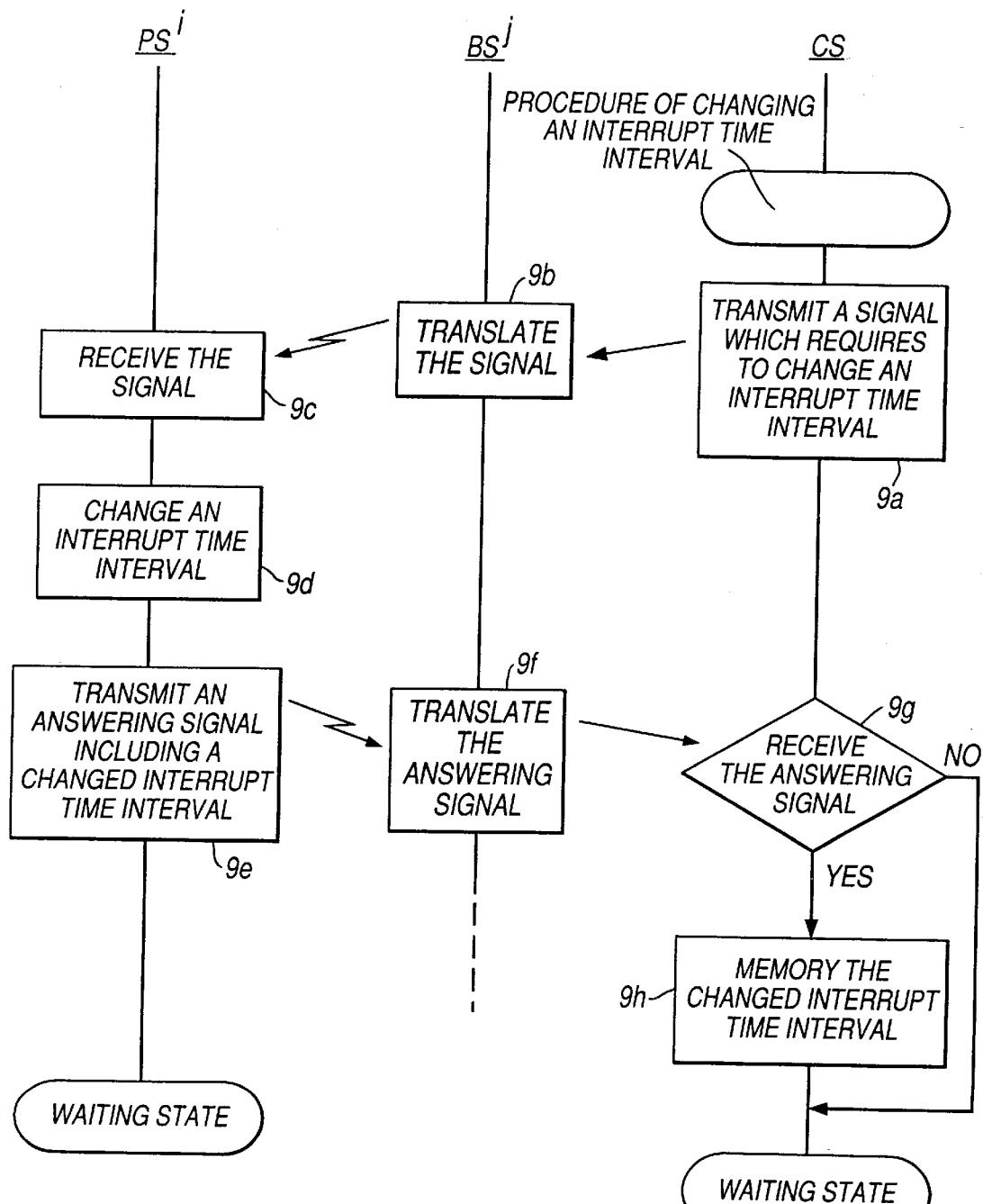
FIG. 9 are flow charts showing a procedure of changing an interrupt time interval in said system as shown in FIG. 1
Figure 10:
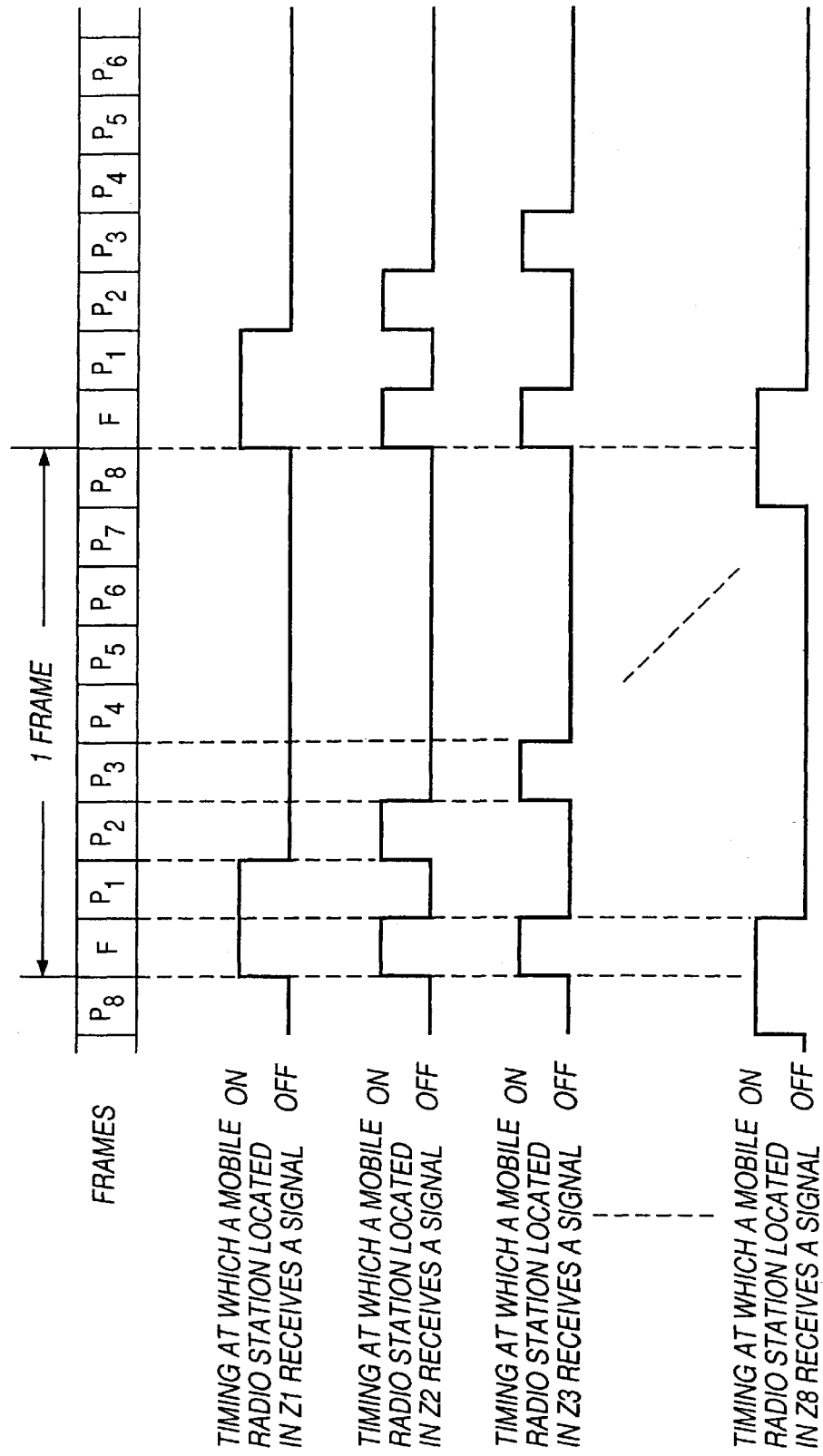
FIG. 10 are timing charts showing a receiving timing which a mobile radio station receives a signal at an interrupt time interval in the prior cellular portable radio telephone system.

The control station CS translates to a procedure of storing, or a procedure of changing the interrupt time interval. The procedure of storing is illustrated in FIG. 7. The procedure of changing the interrupt time interval is illustrated in FIG. 9.

As shown in FIG. 7, the control station CS determines whether the calling station requires a bi-directional communication (for example, communications of telephone or television telephone) or a simplex communication (for example, voicemail, facsimile, other data communication) (step(7a)).

If the calling station requires a simplex communication, the control station determines whether the operator of the mobile radio station PSi makes an agreement to use a storing service with the storing server SV or not(step(7b)).

If the control station CS determines that the operator doesn't make the agreement, the control station CS translate to a procedure of disconnecting (step(7g)). Additionally, the control station CS may transmit a busy tone to the calling station.

If the control station CS determined that the operator makes the agreement(step(7b)), the control station CS translates to a procedure of storing with the storing server SV. In other words, after receiving the incoming call, the control station CS connects to the storing server SV (step(7c)) and transmits a guide message to the calling station(step(7d)). The guide message is used for urging to transmit data addressed to the mobile radio station PSi. The storing server SV stores the message(step(7e)). After the storing server SV stores the data (step(7f)), the control station CS disconnects to the storing server SV(step(7g)). Then, the control station CS returns to a waiting state.

Figure 8A:
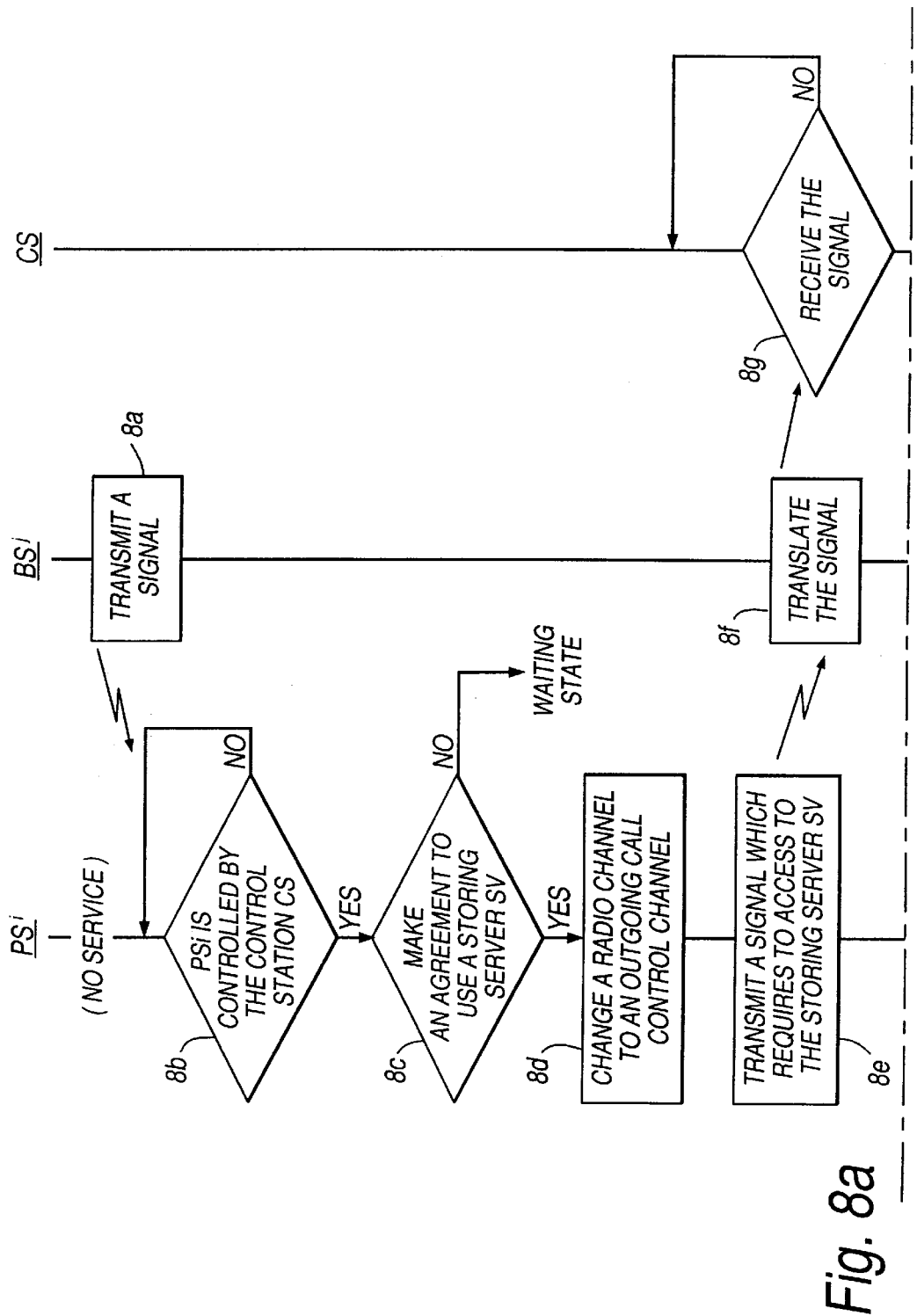
FIG. 8 are flow charts showing a procedure that the mobile radio station PSi inquires whether the storing server SV stores data addressed to the mobile radio station PSi or not and a procedure that the control station CS transmits the stored data to the mobile radio station PSi in said system as shown in FIG. 1
Figure 8B:
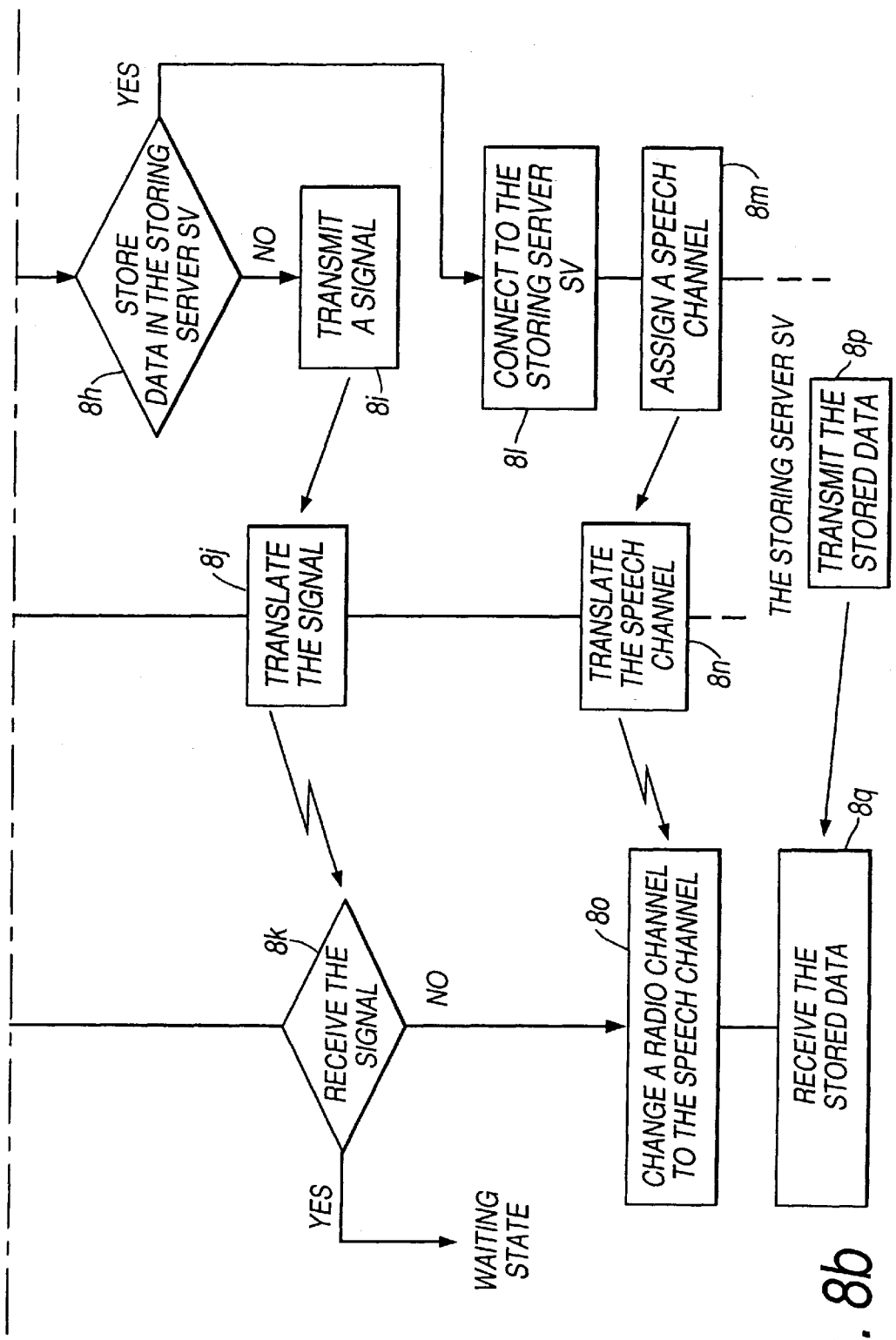

If the mobile radio station PSi is out of the area covered by the base station PSj or the mobile radio station PSi is in the condition that the power switch is off, as shown in FIG. 8, with receiving a signal from the base station BSj over the incoming call control channel (step(8a)), the mobile radio station PSi monitors whether it returns to an area which the control station CS controls or not (step(8b)). Further, if the mobile radio station PSi receives a signal intermittently at the second interrupt time interval T2, the mobile radio station PSi transmits a signal only in the incoming call control channel which the mobile radio station PSi uses.

In above condition, if the operator of the mobile radio station PSi sets the power switch on or the mobile radio station PSi enters into the radio area the control station CS controls, the mobile radio station PSi receives a signal over the incoming call control channel from the base station BSj (step(8b)). The mobile radio station PSi determines whether the operator of the mobile radio station PSi makes an agreement to use a storing service with the storing server SV or not(step(8c)). If the operator of the mobile radio station PSi makes the agreement, the mobile radio station PSi changes the channel to the outgoing call control channel (step(8d)) and transmits a signal which indicates to require an access to the storing server SV to the base station BSj (step(8e)).

If the operator of the mobile radio station PSi doesn't make the agreement, without transmitting the signal to the base station BSj, the mobile radio station PSi translates to a waiting state (step(8c)). Accordingly, the mobile radio station PSi doesn't transmit useless signals, so a traffic of the control channel isn't pressed.

The base station BSj transmits a signal to the control station CS(step(8f)). The signal indicates that the mobile radio station PSi requires the access to the storing server SV. Receiving the signal(step(8g)), the control station CS determines whether the storing server SV stores data addressed to the mobile radio station PSi which requires the access to the storing server SV or not(step(8h)). If the storing server SV stores data addressed to the mobile radio station PSi, the control station CS connects to the storing server SV(step (8l)) and transmits a signal to the base station BSj(step 8m). The signal indicates to assign a speech channel. Then, the control station CS transmits a signal which indicates to demand the storing server SV to transmit the stored data to the mobile radio station PSi.

After receiving the signal which indicates to assign a speech channel among all speech channels, and transmits a signal to the mobile radio station PSi over the outgoing call control channel said signal indicating an information related to the free speech channel (step(8n)).

After receiving the signal, the mobile radio station PSi switches the speech channel which the control station CS assigns(step(8o)). And the control station CS transmits the stored data to the mobile radio station PSi(step(8p)). The mobile radio station PSi receives the stored data from the storing server SV(step(8q)).

As mentioned above, the mobile radio station PSi inquires the control station CS whether the storing server SV stores data addressed to the mobile radio station PSi or not. If the storing server SV stores the data addressed to the mobile radio station PSi, the control station CS transmits the stored data to the mobile radio station PSi.

FIG. 9 shows the procedure of changing the interrupt time interval.

After determining that the calling station requires a bi-directional communication for example communications of telephone or television telephone) by detecting a communication service received from the calling station, the control station CS starts the procedure of changing the interrupt time interval shown in FIG. 9. At this time, the interrupt time interval shown receives a signal intermittently at the second interrupt time interval T2.

As shown in FIG. 9, the control station CS transmits a signal to the base station BSj(step(9a)). The signal indicates that the control station CS requires to change the interrupt time interval in the mobile radio station PSi over the incoming call control channel.

The base station BSj covers an radio area in which the mobile radio station PSi is located. After receiving the signal, the base station BSj transmits the signal to the mobile radio station PSi (step(9b)). After receiving the signal from the base station BSj (step(9c)), the mobile radio station PSi changes the second interrupt time interval T2 to the first interrupt time interval T1 (step(9d)). After changing the interrupt time interval, the mobile radio station PSi transmits an answering signal including a changed interrupt time interval (step(9e)). The base station BSj received the answering signal and transmits the answering signal to the control station CS (step(9f)). After receiving the answering signal(step(9g)), the control station CS memories the interrupt time interval in the mobile radio station PSi and returns to the waiting state(step(9h)).

Further, during or after changing the interrupt time interval, the control station CS transmits a guide message which urges to call again to the calling station. For example, the guide message is following one "Now we're preparing to receive your data. Please call again after 10 minutes". Further the guide message may be a voice message which is outputted from a speaker of the calling station, or an indication which is indicated on a display or the calling station. Furthermore, if the guide message is the indication, the calling station may use an other outputting means, for example, LED (light emitting diode) or a speaker to tell an operator of the calling station the indication certainly.

With transmitting a signal which requires to change the interrupt time interval in the mobile radio station PSi, the control station CS transmits a guide massage which indicated that the control station CS receives the originating call from the calling station. When the mobile radio station PSi receives the guide message, the mobile radio station PSi indicates the guide message with the display unit 24 (shown in FIG. 2) after changing the interrupt time interval. For example, the guide message is following one "You will receive the call in a short time, so please wait for a minute as you are". Further with indicating the guide message with the display unit 24, the mobile radio station PSi may generate a sound which is different from an incoming call sound.

As above mentioned, in this embodiment, each of mobile radio stations PS1 to PSn has the first and second interrupt time intervals.

Each of mobile radio stations PS1 to PSn sets the interrupt time interval in accordance with a time which the timer unit 27 clocks, or the operator of the mobile radio stations set the interrupt time interval by inputting data from operating unit 26.

Accordingly, the operator of the mobile radio station usually sets the second interrupt time interval with long cycle T2 (T2=480 seconds) in the time when the traffic is low (for example, in the midnight). Setting the second interrupt time interval in the time saves an electric power in the mobile radio station.

Further more, each of mobile radio stations PS1 to PSn transmits interrupt time interval to the control station CS. The control station CS memories interrupt time intervals in accordance with each of mobile radio stations PS1 to PSn in accordance with the each interrupt time interval over the incoming call control channel. Accordingly, transmitting a signal to the mobile radio station in accordance with its interrupt time intervals prevents from transmitting a useless signal and raises up a effective rate of using the incoming call control channel.

Furthermore, in this embodiment, when the control station CS receives an incoming call from the calling station, the control station CS determines whether the calling station requires a bi-directional communication (for example, communications of telephone or television telephone) or a simplex communication (for example, voicemail, facsimile, other data communication) and whether the interrupt time interval in the mobile radio station which is called from the calling station is the first interrupt time interval T1 or the second interrupt time interval T2. If the control station CS determines that the calling station requires a simplex communication (for example, voicemail, facsimile, other data communication) and the interrupt time interval in the mobile radio station is the second the interrupt time interval, the control station CS connects to the storing server SV and the storing server SV stores data addressed to the mobile radio station. Accordingly, in the case that the mobile radio station which is called from the calling station receives a signal intermittently at the second interrupt time interval, the calling station can transmit data addressed to the mobile radio station to the control station CS without a danger of no connection with the control station CS because of the connection delay. The storing server SV stores data which is transmitted from the calling station. Furthermore, the operator of the calling station doesn't have to call again to a mobile radio station in the mobile radio communication network for a simplex communication. And the operator of the calling station can use a storing service always in the mobile radio communication network. Furthermore, when a operator of the mobile radio station PSi sets the power switch on, or when the mobile radio station PSi enters into the radio area which the control station can control, the mobile radio station transmits a signal which requires an access to the storing server SV to the control station CS. After receiving the signal, the control station CS determines whether the storing server SV stores data addressed to the mobile radio station PSi or not. If the storing server SV stores the data, the control station CS connects to the storing server SV and transmits the stored data to the mobile radio station PSi. Accordingly, the mobile radio station PSi can confirm whether the storing server SV stores data addressed to the mobile radio station PSi or not when the operator or the mobile radio station PSi sets the power switch on, or when the mobile radio station PSi enters into the radio area the control station CS can control. Furthermore, if the storing server SV stores data addressed to the mobile radio station PSi, the mobile radio station PSi can receive the data the storing server SV stores.

Additionally, in this embodiment, if the control station CS determines that the calling station requires a bi-directional communication (for example, communications of telephone or television telephone) and the mobile station receives a signal intermittently at the second interrupt time interval, the control station CS transmits a signal which indicates to change the interrupt time interval in the mobile radio station.

When the mobile radio station receives the signal through a base station, the mobile radio station changes the second interrupt time interval T2 to the first interrupt time interval T1. Further, the control station CS transmits a guide message which urges to call again after a few minutes to the calling station. Accordingly, after stopping calling to the mobile radio station, when the operator of the calling station calls back to the mobile radio station, the calling station can connect to the mobile radio station smoothly without the connection delay because that the mobile radio station PSi receives a signal intermittently at the first interrupt time interval T1.

In this embodiment, when the operator of the mobile radio station sets the power switch on, or when the mobile radio station PSi enters to the radio area the control station CS can control, the mobile radio station transmits a signal which requires to access to the storing server SV to the control station CS to confirm whether the storing server SV stores the data addressed to the mobile radio station or not.

As mentioned below, there are another methods of confirming whether the storing server SV stores the data or not.

The first another method is that the control station CS informs whether the storing server SV stores the data of the mobile radio station. For example, the control station CS confirms it regularly. If the storing server SV stores data addressed to the mobile radio station, the control station CS transmits a message which indicates that the storing server SV stores the data over the selected incoming call control channel. Additionally, the control station CS transmits the message at the timing when the control station CS doesn't transmit an incoming call signal to the mobile radio station over the incoming control channel.

As mentioned above, without setting the power switch of the mobile radio station on or confirming that the mobile radio station enters into a radio area which the control station CS controls, the control station CS informs that the storing server SV stores the data addressed to the mobile radio station.

Accordingly, the operator of the mobile radio station confirms whether the storing server SV stores the data to the mobile radio station or not as soon as possible. Furthermore, as the control station CS transmits the message at the timing when the control station CS doesn't transmit an incoming call signal to the mobile radio station over the incoming control channel, a traffic of the incoming call control channel isn't pressed. and there is no bad influence for transmitting an incoming call to the control station CS.

There are some methods of informing the message to the mobile radio station that the storing server SV stores data.

One of said some methods is that the mobile radio station indicates the message on the display unit 24 (shown in FIG. 2). Other method are that the mobile radio station outputs the message as a sound message from the transmitting unit 29 (shown in FIG. 2) or that the mobile radio station makes the vibrator unit 30 (shown in FIG. 2) vibrate. Additionally, the mobile radio station may inform the message with the combination method of above methods.

The second another informing method is mentioned below.

When the mobile radio station transmits an outgoing call to the control station CS through a base station, or when the mobile radio station registers the location where the mobile radio station is located to the control station CS, after connecting to the mobile radio station over the control channel, the control station CS determines whether the storing server SV stores data addressed to the mobile radio station or not. If the storing server SV stores the data, the control station CS transmits a message which indicates that the storing server SV stores the data addressed to the mobile radio station.

As mentioned above, the control station CS informs surely whether the storing server SV stores the data addressed to the mobile station or not. Furthermore, as the procedure of outgoing call or registering location or incoming call includes the method of informing the message, informing of the message doesn't press a traffic of the incoming call control channel.

The third another informing method is mentioned below.

In the condition that the power switch of the mobile radio station is off, the mobile radio station set the power switch on automatically at equal interval and transmits a signal which indicates to require to access to the storing server SV to the control station CS. The mobile station confirms whether the storing server SV stores data addressed to the mobile radio station or not. After receiving the signal, the control station CS determines whether the storing server SV stores the data or not and transmits the message which indicates the result of determining to the mobile radio station which transmits the signal. Further, after receiving the message, the mobile radio station memories the message which indicates the result of deciding whether the storing server SV stores the data addressed to the mobile radio station or not. Furthermore, the mobile radio station may indicate the message on the display unit 24 or output the message as a sound message from the transmitting a signal which indicates to require to access to the storing server SV to the control station to receive the stored data. As mentioned above, after once receiving the message which indicates the result of deciding whether the storing server SV stores data addressed to the mobile radio station or not, the mobile radio station CS over the control channel to confirm whether the storing server SV stores the data to the mobile radio station or not. Accordingly, a traffic of the control channel isn't pressed.

Further, in above embodiment, the control station CS changes the second interrupt time interval T2 to the first interrupt time interval T1 when the control station CS determines that the calling station requires bi-directional communicates (for example, communications of telephone or television telephone) and the mobile radio station called from the calling station receives a signal intermittently at the second interrupt time interval. In this invention, the control station may change the second interrupt time interval T2 to the always receiving mode temporary. By changing to the always receiving mode, the mobile station answers the call from the calling station immediately when the calling station calls again.

Furthermore, in above embodiment, the storing server SV is set up outside the control station CS as shown in FIG. 3. The storing server SV may be set up inside the control station CS as a part of the control station CS.

As mentioned above, in this invention, a mobile radio station sets an interrupt time interval at which the mobile station receives and informs the interrupt time interval to a mobile radio communication network. The interrupt time interval is suitable for saving a consumption of a electric power in the mobile radio station. The mobile radio communication network transmits a signal to the mobile station at the informed interrupt time interval. Accordingly, as the mobile radio station receives a signal at the set interrupt time interval, the mobile radio communication system saves a consumption of a electric power in the mobile radio station. The mobile radio communication network don't have to transmit useless signals to the mobile radio station in waiting state.

Furthermore, in this invention, when a calling station requires a simplex communication to the mobile station in the mobile radio communication network, the network determines whether the mobile radio station receives a signal at a first interrupt time interval or a second interrupt time interval. If the mobile radio station receives a signal at the second interrupt time interval, the mobile radio communication network receives data addressed to the mobile radio station from the calling station and stores the data in a storing server. After changing the second interrupt time interval to the first interrupt time interval, the mobile communication network transmits the stored data to the mobile radio station.

Accordingly, though any kinds of interrupt time interval is set in a radio mobile station, the calling station can transmit data to the mobile radio station surely. And the calling station doesn't have to call again to the radio mobile station to transmit the data. The mobile radio communication system can provide a valuable service to users.

With regard to the control sequences, contents of the control station and base stations and mobile radio stations, various changes and modifications can be made within the spirit and scope of the invention. for example, in above embodiment, the mobile radio communication system has two interrupt time intervals. In this invention, the system may have three or more interrupt time intervals and set one of the interrupt time intervals in the mobile radio station suitably.

What is claimed is:

1. A mobile radio communication system including at least one mobile radio station and a mobile radio communication network connected to said mobile radio station over radio channels, said mobile radio communication system comprising:

said mobile radio station including:

setting means for setting an interrupt time cycle for receiving a control signal, and informing means for informing said set interrupt time cycle to said mobile radio communication network; and said mobile communication network including:
  detecting means for detecting said interrupt time cycle informed from said mobile radio station, and
  transmitting means for transmitting a set of control signals to said mobile radio station at said detected interrupt time cycle.

2. A mobile radio communication system including at least one mobile radio station and a mobile radio communication network connected to said mobile radio station over radio channels, said mobile radio communication system comprising:
  said mobile radio station including:
    setting means for setting a first time cycle or a second time cycle which is shorter than said first time cycle for receiving a control signal, and
    informing means for informing said set interrupt time cycle to said mobile radio communication network; and
  said mobile communication network including:
    detecting means for detecting said informed time cycle, and
    transmitting means for transmitting a set of control signals to said mobile radio station at said detected time cycle, wherein said mobile communication network transmits data which a calling station transmits to said mobile station in case that said calling station requires one-way communication and said detected time cycle is said second time cycle.

3. A mobile radio communication system including at least one mobile radio station and a mobile radio communication network connected to said mobile radio station over radio channels, said mobile radio communication system comprising:
  said mobile radio station including:
    setting means for setting a first time cycle or a second time cycle for which is shorter than said first time cycle for receiving a control signal, and
    informing means for informing said set interrupt time cycle to said mobile radio communication network; and
  said mobile communication network including:
    detecting means for detecting said informed time cycle,
    transmitting means for transmitting a set of control signals to said mobile radio station at said detected time cycle, and
    storing means for storing data which a calling station transmits to said mobile radio station, wherein said mobile communication network stores said data in said storing means in case that said calling station requires one-way communication and said detected time cycle is said first time cycle.

4. A mobile radio communication system according to claim 3, said mobile radio station further including: inquiring means for inquiring of said mobile radio communication network whether said storing means stores data addressed to said mobile radio station or not.

5. A mobile radio communication system according to claim 4, wherein said inquiring means inquires of said mobile radio communication network in case that a radio link between said mobile radio station and said mobile radio communication network is established.

6. A mobile radio communication system according to claim 4, wherein said inquiring means inquires of said mobile radio communication enters into said radio control area.

7. A mobile radio communication system according to claim 4, wherein said inquiring means inquires of said mobile radio communication network intermittently at said set interrupt time interval.

8. A mobile radio communication system according to claim 4, said mobile radio network further including:
  transmitting means in response to said inquiring means for transmitting an answering signal.

9. A mobile radio communication system according to claim 8, wherein said transmitting means transmits said answering signal to said mobile station in except that said mobile radio communication network communicates any information having a priority compared to said answering signal.

10. A mobile radio communication system according to claim 8, wherein said transmitting means transmits said answering signal to said mobile station in case that said mobile radio communication network receives an incoming call signal addressed to said mobile radio station.

11. A mobile radio communication system according to claim 8 wherein said transmitting means transmits said answering signal to said mobile station in case that said mobile radio communication network receives an outgoing call signal from said mobile radio station.

12. A mobile radio communication system according to claim 8, wherein said transmitting means transmits said answering signal to said mobile station in case that said mobile radio communication network receives a signal during a location registration sequence from said mobile radio station.

13. A mobile radio communication system according to claim 8, said mobile radio station further including:
  alarming means for alarming a user of said mobile station to inform that said answering signal is received.

14. A mobile radio communication system according to claim 13, wherein said alarming means includes a display means for displaying an information indicating that said answering signal is received.

15. A mobile radio communication system according to claim 13, wherein said alarming means includes sound generating means for generating sound indicating that said answering signal is received.

16. A mobile radio communication system according to claim 13, wherein said alarming means includes vibration means for vibrating a housing of said mobile station to indicate that said answering signal is received.

17. A mobile radio communication system according to claim 4, said mobile radio station further including:
  wherein said inquiring means inquires of said mobile radio communication network whether said storing means stores data addressed to said mobile station or not in accordance with said counted time.

18. A mobile radio communication system including at least one mobile radio station and a mobile radio communication network connected to said mobile radio station over radio channels, said mobile radio communication system comprising:
  said mobile radio station including:
    setting means for setting a first time cycle or a second time cycle for which is shorter than said first time cycle for receiving a control signal, and
    informing means for informing said set time cycle to said mobile radio communication network; and
  said mobile radio communication network including:
    determining means for determining whether a calling station requires a one-way communication or a bi-directional communication to a mobile radio station, and transmitting means for transmitting a set of control signals to said mobile station in case that said determining means determines said calling station requires a one-way communication and said informed time cycle is said first time cycle, said control signals indicating that said mobile radio communication network requires to change said first time cycle to said second time cycle.

19. A mobile radio communication system including at least one mobile radio station and a mobile radio communication network connected to said mobile radio station over radio channels, said mobile radio communication system comprising:

said mobile radio station including:
setting means for setting a first time cycle or a second time cycle for which is shorter than said first time cycle for receiving a control signal, and
informing means for informing said set time cycle to said mobile radio communication network; and
said mobile radio communication network including:
determining means for determining whether a calling station requires a one-way communication or a bi-directional communication to a mobile radio station and
transmitting means for transmitting a set of control signals to said mobile station in case that said determining means determines said calling station requires a bi-directional communication and said informed time cycle is said first time cycle, said control signals indicating that said mobile radio communication network requires to change said first time cycle to said second time cycle.

20. A mobile radio communication system including at least one mobile radio station and a mobile radio communication network connected to said mobile radio station over radio channels, said mobile radio communication system comprising:

said mobile radio station including:
setting means for setting a first time cycle or a second time cycle for which is shorter than said first time cycle for receiving a control signal, and
informing means for informing said set time cycle to said mobile radio communication network; and
said mobile radio communication network including:
determining means for determining whether a calling station requires a one-way communication or a bi-directional communication to a mobile radio station, and
preventing means for preventing said calling station from being connected to said mobile radio station in case that said determining means determines said calling station requires a bi-directional communication and said informed time cycle is said first time cycle.

21. A mobile radio communication system according to claim 20, said mobile radio communication network further including: transmitting means for transmitting a set of control signals to said mobile station, said control signals indicating that said mobile radio communication network requires to change said first time cycle to said second time cycle.

22. A mobile radio communication system according to claim 20, said mobile radio communication network further including: transmitting means for transmitting a signal to said calling station, said signal indicating that said mobile radio communication network is prevented from being connected to said mobile radio station.

23. A mobile radio communication system according to claim 20, said mobile radio communication network further including:
transmitting means for transmitting a signal to said calling station, said signal indicating that said mobile radio communication network requires an outgoing call addressed to said called mobile station.

24. A mobile radio communication network connected to at least one mobile radio station over radio channels, said mobile radio communication network comprising:
determining means for determining whether a calling station requires a one-way communication or a bi-directional communication to a mobile radio station, detecting means for detecting a time cycle set in a mobile radio station for transmitting a set of control signals intermittently to said mobile radio station, said time cycle being a first time cycle or a second time cycle which is shorter than said first time cycle, transmitting means for transmitting data which is received from said calling station to a mobile radio station in case that said determining means determines that said calling station requires a one-way communication and detected time cycle set in said mobile radio station is said second time cycle.

25. A mobile radio communication network connected to at least one mobile radio station over radio channels, said mobile radio communication network comprising:
storing means for storing data addressed to a mobile radio station said data being transmitted by a calling station,
determining means for determining means for determining whether a calling station requires a one-way communication or a bi-directional communication to a mobile radio station,
detecting means for detecting a time cycle set in a mobile radio station for transmitting a set of control signal intermittently to said mobile radio station, said time cycle being a first time cycle or a second time cycle which is shorter than said first time cycle, and
controlling means for controlling that said mobile radio communication network stores said data in said storing means in case that said determining means determines that said calling station requires a one-way communication and detected time cycle set in said mobile radio station is said first time cycle.

26. A mobile radio communication network connected to at least one mobile radio station over radio channels, said mobile radio communication network comprising:
determining means for determining whether a calling station requires a one-way communication or a bi-directional communication to a mobile radio station,
detecting means for detecting a time cycle in a mobile radio station for transmitting a set of control signals intermittently to said mobile radio station, said time cycle being a first time cycle or a second time cycle which is shorter than said first time cycle, and
transmitting means for transmitting a set of control signals to said mobile radio station in case that said determining means determines said calling station requires a one-way communication and detected time cycle set in said mobile radio station is said first time cycle, said control signal requiring to change said first time cycle to said second time cycle.

27. A mobile radio communication network connected to at least one mobile radio station over radio channels, said mobile radio communication network comprising:
determining means for determining whether a calling station requires a one-way communication or a bi-directional communication to a mobile radio station, detecting means for detecting a time cycle set in a mobile radio station for transmitting a set of control signals intermittently to said mobile radio station, said time cycle being a first time cycle or a second time cycle which is shorter than said first time cycle, and transmitting means for transmitting a set of control signals to said mobile radio station in case that said determining means determines said calling station requires a bi-directional communication and detected time cycle set in said mobile radio station is said first time cycle, said control signal requiring to change said first time cycle to said second time cycle.

28. A mobile radio communication network connected to at least one mobile radio station over radio channels, said mobile radio communication network comprising:

determining means for determining whether a calling station requires a one-way communication or a bi-directional communication to a mobile radio station, detecting means for detecting a time cycle set in a mobile radio station for transmitting a control signal intermittently to said mobile radio station, said time cycle being a first time cycle or a second time cycle which is shorter than said first time cycle, and preventing means for preventing a calling station from being connected to said mobile radio station in case that said determining means determines said calling station requires a bi-directional communication and said detected time cycle is said first time cycle.

29. A mobile radio communication network according to claim 28, said mobile radio communication network further comprising:

transmitting means for transmitting a control signal to said mobile station, said control signal indicating that said mobile radio communication network requires to change said first time cycle to said second time cycle.

30. A mobile radio communication network according to claim 28, said mobile radio communication network further comprising:

transmitting means for transmitting a signal to said calling station, said signal indicating that said mobile radio communication network is prevented from being connected to said mobile radio station.

31. A mobile radio communication network according to claim 28, said mobile radio communication network further comprising:

transmitting means for transmitting a signal to said calling station, said signal indicating that said mobile radio communication network requires an outgoing call addressed to said called mobile station.

32. A mobile radio station connected to a mobile radio communication network over radio channels, said mobile radio station comprising:

setting means for setting an interrupt time cycle for receiving a control signal;

informing means for informing said set interrupt time to said mobile radio communication network; and receiving means for receiving a set of control signals transmitted from said mobile radio communication network intermittently at said set time cycle.

33. A mobile radio station according to claim 32, said mobile radio station further comprising:

indicating means for indicating said set time cycle to said mobile radio station user.

34. A mobile radio station receives a signal intermittently at a first interrupt time interval or a second interrupt time interval which is shorter than said first interrupt time interval, said mobile radio communication network according to claim 32, said mobile communication network having storing means for storing data addressed to said mobile radio station, and said mobile radio station further comprising:

inquiring means for inquiring of said mobile radio communication network whether said storing means stores data addressed to said mobile radio station or not.

35. A mobile radio station according to claim 34, wherein said inquiring means inquires of said mobile communication network in case that a radio link between said mobile radio station and said mobile radio communication network is established.

36. A mobile radio station according to claim 34, wherein said inquiring means inquires of said mobile communication network in case that said mobile radio station re-enters into a radio control area.

37. A mobile radio station according to claim 34, wherein said inquiring means inquires of said mobile communication network intermittently at said set time cycle.

38. A mobile radio station according to claim 34, said mobile radio station further comprising alarming means for alarming an user of said mobile radio station to inform that an answering signal is received in response to inquiring that said inquiring means inquires.

39. A mobile radio station according to claim 38, wherein said alarming means includes a display means for displaying information indicating said answering signal is received.

40. A mobile radio station according to claim 38, wherein said alarming means includes sound generating means for generating sound indicating said answering signal is received.

41. A mobile radio station according to claim 38, wherein said alarming means includes vibrating means for vibrating a housing of said mobile station to indicate that said answering signal is received.

42. A mobile radio station according to claim 34, said mobile radio station further comprising:

counting means for counting time, wherein said inquiring means inquires of said mobile radio communication network whether said storing means stores data addressed to said mobile radio station or not in accordance with said counted time.

* * * * *